United States Patent Office 3,072,605
Patented Jan. 8, 1963

3,072,605
POLYURETHANE STABILIZATION
William A. Rogers, Jr., Claude A. Latta, Louis R. Knodel, and Arthur E. Gurgiolo, all of Lake Jackson, Tex., assignors to The Dow Chemical Company, Midland, Mich., a corporation of Delaware
No Drawing. Filed Aug. 29, 1960, Ser. No. 52,334
6 Claims. (Cl. 260—45.95)

This invention relates to the stabilization of the reaction product of polyalkylene glycols with polyisocyanates against oxidation and discoloration.

Within the past few years, a new field of polymer chemistry has been developed which involves the reaction of diisocyanates with compounds containing active hydrogen. Depending upon the individual reactants and the ratios employed, the end products are polyurethane foams, adhesives, protective coatings, and synthetic rubber compositions.

In many of these formulations for specific end products, it is highly desirable that a polyether-type compound, terminating in at least two hydroxyl groups, be utilized as the active hydrogen source for reaction with the diisocyanate. The polyether-type compound can be made by methods known to the art wherein an alkylene oxide is polymerized under the influence of an acid or base catalyst. Along with the catalyst, a polyol initiator, such as for example, glycol, glycerine, or sucrose is employed.

However, a disadvantage is encountered when a polyether polyhydroxy compound is used as the active hydrogen source in that the resulting polyurethane readily discolors from a colorless compound to various shades of yellow and brown. This discoloration is attributed to air and light and is accelerated by heat.

It is an object of the present invention to stabilize the reaction product of polyalkylene glycols with polyisocyanates against oxidation and discoloration.

It has been discovered that phosphoric acid has the unique ability to act synergistically with phenolic compounds of the type

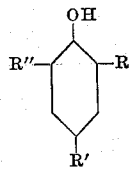

wherein R, R' and R'' can be H, OH, alkyl, carbaloxy or alkoxyl and R' or R can further be an alkylidene phenol of the type

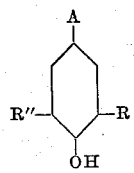

wherein A is alkylidene and R and R'' are as above, to prevent the oxidation and discoloration of the reaction product of polyalkylene glycols with polyisocyanates, which combination is far superior to either the phenolic compound or phosphoric acid alone. Further, it has been found that the amount of phosphoric acid is critical and the combination is synergistically operative only in a pH range of from 5.0 to 7.0 inclusive.

Within the above pH range, the actual concentration of phosphorus expressed as $PO_4$ is preferably in the range of 25 to 75 p.p.m. and more preferably in the range of 40 to 50 p.p.m. When the $PO_4$ concentration was above or below this range, color again increased. The phenolic compound can preferably be employed in the range of from at least about 250 to 1000 p.p.m. and higher. The use of more than 1000 p.p.m., while not detrimental, provides little additional benefit.

The following examples illustrate the practice of the invention.

GENERAL PROCEDURE

Stability was determined by the following test. Into a 25 x 200 mm. test tube were charged 30 grams of polyoxypropylene glycol of molecular weight about 2000, hereinafter called P-2000, and 3.9 grams of tolylene diisocyanate. This amount will give a 50% excess of diisocyanate. A 0.4 x 6 mm. capillary glass tube was inserted through a stopper and the stopper was loosely inserted into the test tube in such a manner that the glass tubing extended nearly to the bottom of the test tube. The test tube was then lowered into a constant temperature oil bath maintained at a temperature of 120° C. Dry air was bubbled through the reaction mixture at the rate of 180 cc. per minute. After a one-hour reaction period, the test tube was removed from the oil bath and a sample of the contents was poured into a standard Gardner tube. The color was then compared with a set of Gardner color standards wherein color 1 was a very low pale yellow and color 10 was a deep yellow.

In one series of tests, the commercial grade P-2000, having a pH of 6.5, and without the addition of any acid, was stabilized with varying amounts of 2,6-di-tert.-butyl-4-methylphenol and tested as above described. The pH was determined by dissolving a 10 gram sample of the polyalkylene glycol in 60 mls. of a methanol-water solution and measuring the resulting solution with a pH meter. The methanol-water solution had a pH, natural or adjusted with HCl, of 7 and consisted of 90% (by weight) methanol and 10% water. In a further test, prepolymers thus produced were converted to foamed polyurethanes by adjusting the NCO content and foaming by methods known to the art.

Results are shown in the following table.

Table I

| 2,6-di-tert.-butyl-4-methylphenol (p.p.m.) | Prepolymer Gardner Color Number | Foam Color, 3 days-Damp Indoors Subdued light |
|---|---|---|
| 250 | 7.0 | yellow. |
| 500 | 2.0 | pale yellow. |
| 1,000 | 1.0 | Do. |

Table I shows that 250 p.p.m. of 2,6-di-tert.-butyl-4-methylphenol are insufficient to prevent oxidation and discoloration while 500 p.p.m. tended to improve but not prevent color formation. Also, foams made with prepolymers containing the above amounts of 2,6-di-tert.-butyl-4-methylphenol discolored as per column three. After 3 days, even the foam with 1000 p.p.m. of 2,6-di-tert.-butyl-4-methylphenol turned pale yellow.

The following Table II shows the results obtained when the pH of the P-2000 was varied from 3 to 8.0 by using the acids indicated. The adjusted samples were then subjected to the color test described above.

*Table II*

| pH | Acid | 2,6-di-tert.-butyl-4-methylphenol, p.p.m. | TDI Color Test Gardner Color |
|---|---|---|---|
| 5.6 | H$_3$PO$_4$ | 0 | 7 |
| 5.6 | H$_3$PO$_4$ | 250 | 1 |
| 5.6 | H$_2$SO$_4$ | 250 | 7 |
| 5.6 | HCl | 250 | 7 |
| 4.0 | H$_3$PO$_4$ | 250 | 7 |
| 7.0 | H$_3$PO$_4$ | 250 | 1 |
| 5.0 | H$_3$PO$_4$ | 250 | 1 |

Not only was the prepolymer, prepared from the P-2000 stabilized with 250 p.p.m. of 2,6-di-tert.-butyl-4-methylphenol at a pH of 5.6 adjusted with H$_3$PO$_4$, colorless, but foams prepared therewith had improved whiteness and resisted yellowing. When a prepolymer, prepared from the P-2000 stabilized with 250 p.p.m. of 2,6-di-tert.-butyl-4-methylphenol at a pH of 5.6 adjusted with HCl, was used, the initial foam was light yellow and became a very deep yellow after 6 days. Neither HCl nor H$_2$SO$_4$ possess the ability to produce the synergistic effect upon the 2,6-di-tert.-butyl-4-methylphenol.

In the above described manner employing P-2000; 2,5-ditertiaryamylhydroquinone, butylated hydroxy anisole, n-propyl gallate, n-butyl-para-hydroxy benzoate, and bisphenol A, when employed in an amount of 250 p.p.m. at a pH of 5.6 with phosphoric acid, had Gardner color ratings respectively of less than 1, 1, 1, 2, and 2.

Results similar to those described above are obtained by the use of other polyoxyalkylene polyols useful in making polyurethanes, such as P-1000, P-4000, the polyglycols obtained by the condensation of ethylene oxide, propylene oxide or 1,2-butylene oxide or mixtures thereof, with water, an alkylene glycol, glycerol, trihydroxybutane, sucrose or the like. Likewise, other polyisocyanates may be used, such as phenylene diisocyanate, hexamethylene diisocyanate, 4,4'-alkylene-bis(phenylisocyanate) and the like. In general, the invention is useful wherever the oxidative discoloration of polyether polyurethanes is a problem.

In our invention it is the phosphate ion that is effective rather than phosphoric acid itself. Accordingly, when polyglycols are used which do not require pH adjustment, the requisite phosphate may be supplied in whole or in part in the form of a salt.

Since it is common practice in the manufacture of polyglycols to use an alkali catalyst, to neutralize such catalyst with acid, and to stabilize the product with 2,6-di-tert.-butyl-4-methylphenol, it is convenient to use phosphoric acid in such neutralization, thus producing a polyglycol ready for use in the present invention with little or no addition of more phosphate or phenol.

The term "polyether polyurethane" as used herein refers to and includes any polymeric polyurethane made by the reaction of an organic polyisocyanate with a polyether polyol. The latter term includes polyols made by condensing one or more alkylene oxides with a compound containing at least two hydrogen atoms reactive with alkylene oxides.

We claim:

1. Polyether polyurethanes made by the reaction of an organic polyisocyanate with a polyether polyol, said polyol having a pH of 5 to 7 and containing, as a stabilizer, a mixture of phosphoric acid and 2,6-di-tert.-butyl-4-methylphenol.

2. Polyurethanes as defined in claim 1 wherein the polyether component consists predominantly of polyoxypropylene chains.

3. Polyether polyurethanes as defined in claim 1 containing, as a stabilizer, about 25 to 75 parts per million of phosphoric acid and at least about 250 parts per million of 2,6-di-tert.-butyl-4-methylphenol, all parts being by weight.

4. A liquid polyether polyurethane prepolymer formed by the reaction of an excess of an organic polyisocyanate with a polyether polyol, said polyol having a pH of 5 to 7, and stabilized against oxidative discoloration by the inclusion therein of a small but effective amount of a mixture of phosphoric acid and 2,6-di-tert.-butyl-4-methylphenol.

5. A prepolymer as defined in claim 4 wherein the polyether polyol is polyoxypropylene glycol.

6. A liquid polyether polyurethane prepolymer formed by the reaction of a stoichiometric excess of an arylene diisocyanate with polyoxypropylene glycol, said glycol having a pH of 5 to 7 and stabilized against oxidative discoloration by the inclusion therein of about 25 to 75 parts per million of phosphoric acid and about 250 to 1000 parts per million of 2,6-di-tert.-butyl-4-methylphenol, all parts being by weight.

References Cited in the file of this patent

UNITED STATES PATENTS

| | | |
|---|---|---|
| 2,830,038 | Pattison | Apr. 8, 1958 |
| 2,915,496 | Swart et al. | Dec. 1, 1959 |

FOREIGN PATENTS

| | | |
|---|---|---|
| 1,155,679 | France | Dec. 2, 1957 |